(12) United States Patent
To et al.

(10) Patent No.: US 9,019,919 B2
(45) Date of Patent: Apr. 28, 2015

(54) BASE STATION APPARATUS, TERMINAL APPARATUS AND WIRELESS COMMUNICATION SYSTEM USING THEM

(75) Inventors: Shimpei To, Osaka (JP); Takashi Onodera, Osaka (JP); Kozue Hirata, Osaka (JP); Hiroshi Nakano, Osaka (JP); Hiromichi Tomeba, Osaka (JP); Minoru Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 167 days.

(21) Appl. No.: 13/700,756

(22) PCT Filed: May 27, 2011

(86) PCT No.: PCT/JP2011/062161
§ 371 (c)(1),
(2), (4) Date: Nov. 29, 2012

(87) PCT Pub. No.: WO2011/152294
PCT Pub. Date: Dec. 8, 2011

(65) Prior Publication Data
US 2013/0121277 A1    May 16, 2013

(30) Foreign Application Priority Data
May 31, 2010 (JP) .................................. 2010-124734

(51) Int. Cl.
*H04B 7/06* (2006.01)
(52) U.S. Cl.
CPC ............ *H04B 7/0697* (2013.01); *H04B 7/0617* (2013.01)
(58) Field of Classification Search
CPC ............................ H04B 7/0617; H04B 7/0697
USPC ........................................................ 370/329
See application file for complete search history.

(56) References Cited

U.S. PATENT DOCUMENTS

| 8,462,715 | B2 | 6/2013 | Shimomura | |
|---|---|---|---|---|
| 2009/0304128 | A1* | 12/2009 | Izumi et al. | 375/343 |
| 2010/0118789 | A1 | 5/2010 | Shimomura | |
| 2011/0134848 | A1 | 6/2011 | Tamaki | |
| 2011/0134850 | A1 | 6/2011 | Kishigami et al. | |
| 2011/0176439 | A1* | 7/2011 | Mondal et al. | 370/252 |
| 2012/0026964 | A1* | 2/2012 | Koivisto et al. | 370/329 |

FOREIGN PATENT DOCUMENTS

| WO | WO 2009/013810 A1 | 1/2009 |
|---|---|---|
| WO | WO 2010/013751 A1 | 2/2010 |
| WO | WO 2010/018690 A1 | 2/2010 |

* cited by examiner

*Primary Examiner* — Charles C Jiang
*Assistant Examiner* — Thad Defauw
(74) *Attorney, Agent, or Firm* — Birch, Stewart, Kolasch & Birch, LLP

(57) ABSTRACT

When signals received by receiving antennas included in each terminal are subjected to MMSE combining, it is configured that each terminal is able to grasp position of desired signal in signal vector obtained after combining. A base station 100 receives by a receiving antenna 23 from the terminal apparatus channel state information between a transmitting antenna 16 and spatial multiplexing object antennas included in each terminal apparatus. A transmit weight calculation unit 19 calculates a transmit weight for performing spatial multiplexing transmission to the terminal apparatus based on the channel state information. Transmit weight multiplication unit s 12 and 18 multiplies an information signal addressed to each terminal apparatus to be performed spatial multiplexing by the transmit weight. A signal multiplexing unit 13 multiplexes the information signal multiplied by the transmit weight and an information to specify the information signal that needs to be demodulated by each terminal apparatus.

2 Claims, 8 Drawing Sheets

BASE STATION APPARATUS, TERMINAL APPARATUS AND WIRELESS COMMUNICATION SYSTEM USING THEM

FIELD OF THE INVENTION

The present invention relates to a base station apparatus in MIMO transmission or the like for transmitting a signal subjected to spatial multiplexing to a terminal apparatus having a plurality of receiving antennas from a base station having a plurality of transmitting antennas, a terminal apparatus and a wireless communication system using them.

BACKGROUND ART

In order to resolve densely used frequency resources along with an increased data communication amount in the cellular system, as a technology to realize a high frequency usage efficiency and high-speed transmission, downlink MIMO (Multiple-Input Multiple-Output) transmission in which a plurality of transmitting signals are subjected to spatial multiplexing using a plurality of transmitting antennas included in a base station has been actively researched. In the downlink MIMO transmission, Single User-MIMO (SU-MIMO) in which a plurality of transmitting signals are subjected to spatial multiplexing which are addressed to a single terminal having a plurality of antennas is an essential technology to improve maximum transmission speed of each terminal, in which however there is a possibility that a transmitting antenna included in a base station is not effectively used due to limitation of the number of antennas included in the terminal. Contrary to this, as shown in FIG. 8, Multi User-MIMO (MU-MIMO) in which transmitting signals addressed to a plurality of terminals 2000*a*, 2000*b* and 2000*c* are subjected to spatial multiplexing to be transmitted simultaneously enables to effectively use an antenna on a base station 1000 side even when only a small number of antennas are included in the respective terminals 2000*a*, 2000*b* and 2000*c*, thus attracting attention as a technology to improve cell throughput.

In the MU-MIMO transmission, for transmission of signals addressed to a plurality of terminals with a same resource, it is necessary to perform precoding to signals on a base station side in advance for transmission so that the signals received by respective terminals do not interfere with each other. A method of the precoding is roughly classified into linear precoding in which a plurality of transmitting signals are multiplied by a linear weight, and nonlinear precoding in which a known interference signal is sequentially subtracted from a transmitting signal and thereafter multiplied by a linear weight, and the linear precoding is, though characteristics thereof are slightly degraded compared with the nonlinear precoding, able to realize spatial multiplexing to a plurality of signals with very simple processing.

The linear precoding includes some types, and linear MMSE (Minimum Mean Square Error) precoding which minimizes a mean square error between a signal received at each terminal and a desired signal is a method in which excellent transmitting characteristics with relatively simple processing is obtained. Here, a weight $P_{MMSE}$ according to linear MMSE is shown as follows in the case where a base station having four transmitting antennas performs spatial multiplexing to signals for four terminals each having two receiving antennas. Note that, each terminal is assumed to notify a base station of channel states between one of the two receiving antennas included in each terminal and the four antennas included in the base station. When a matrix which collectively represents channels notified from each of the terminals respectively is assumed to be H, the weight $P_{MMSE}$ is expressed as follows.

[Math 1]
$$P_{MMSE} = (H^H H + \xi I_{4\times 4})^{-1} H^H \tag{1}$$

Wherein, $H=[H_{11}{}^T H_{21}{}^T H_{31}{}^T H_{41}{}^T]^T$, and $H_{mn}$ is a vector of one row and four columns representing channels between an antenna n of a terminal m and four antennas in a base station. Further, $\xi$ is a mean noise power to signal power ratio, and $I_{k\times k}$ shows a unit matrix of k rows and k columns. Here, when a signal vector addressed to terminals is assumed to $x=[x_1\ x_2\ x_3\ x_4]^T$, a receiving signal vector of collected signals received by respective antennas for notification of a channel to the base station, $y=[y_{11}\ y_{21}\ y_{31}\ y_{41}]^T$ is represented by $y=HP_{MMSE}x+z$. Wherein $z=[z_{11}\ z_{21}\ z_{31}\ z_{41}]^T$ is a vector representing thermal noise added at the antenna n of the terminal m.

Multiplying a signal addressed to each terminal by such a linear weight $P_{MMSE}$ for transmission enables to perform spatial multiplexing to signals addressed to a plurality of terminals while suppressing multi-user interference in which signals addressed to respective terminals interfere with each other on a receiving side. In this manner, the terminal m for receiving such signals after being subjected to spatial multiplexing demodulates signals received at an antenna 1 respectively to be able to obtain desired information, however, each terminal has two receiving antennas and even at the antenna 2 which is not the target of spatial multiplexing processing in the base station, some signal is to be received. The signal received by the antenna 2 is not the target of spatial multiplexing processing in the base station, and includes a large amount of interference, so that even when the signal received at the antenna 2 of each terminal is demodulated, it is impossible to obtain a desired signal correctly. However, it has been known that since this signal also includes a desired signal component, appropriately combined with the signal received by the antenna 1 and the combined signal is demodulated, excellent receiving characteristics are thereby able to be obtained compared to a case where a signal received only by the antenna 1 is demodulated (Non-Patent Literature 1).

Here, a receiving signal vector $y_m=[y_{m1}\ y_{m2}]^T$ received by two antennas of the terminal m is expressed by $y_m=H_m P_{MMSE} x + z_m$. Wherein $H_m = [H_{m1}{}^T\ H_{m2}{}^T]^T$, and $z_m=[z_{m1}\ z_{m2}]^T$ is a thermal noise vector at the terminal m. In a combining method shown in Non-Patent Literature 1, such the received signal is multiplied by a receiving MMSE weight expressed by a following formula and subjected to combining. The receiving weight is to minimize a mean square error between a signal received at each terminal and a desired signal vector transmitted from the base station.

[Math 2]
$$W_m = (H_m P_{MMSE})^H \{H_m P_{MMSE}(H_m P_{MMSE})^H + \xi I_{2\times 2}\}^{-1} \tag{2}$$

The signal after receiving weight multiplication at the terminal m is expressed as $W_m y_m = W_m(H_m P_{MMSE} x + z_m)$, and m-th signal among the signals after the receiving weight multiplication is a desired signal of the terminal m. At each terminal, signals received at two antennas are combined in this way, so that it becomes possible to combine a desired signal component included in a signal received by an antenna which is not subjected to spatial multiplexing at the base station side, thereby allowing to obtain excellent receiving characteristics compared to the case of demodulating a signal received at one antenna.

Additionally, in general, there is a difference in the time of measuring a channel H at a terminal and spatial multiplexing transmission using a linear weight based on the measured channel H, and thereby, in the case of movement of a terminal, or the like, the channel varies in time and the multi-user interference is not completely suppressed, which poses a problem, however, since the combining method shown in Non-Patent Literature 1 is a method of combining signals received by two antennas based on an actual channel state in spatial multiplexing transmission, which is considered to be effective for suppressing multi-user interference occurred due to such time variation of a channel.

PRIOR ART LITERATURES

Non-Patent Literatures

Non-Patent Literature 1: "Interference Cancellation for Downlink MU-MIMO," IEEE802.11 09/1234r0, November 2009.

SUMMARY OF THE INVENTION

Problems to be Solved by the Invention

Combining signals received by two antennas using a receiving weight as shown in Non-Patent Literature 1 enables to obtain excellent receiving characteristics compared to a case of demodulating a signal received by one antenna, however, the signals after receiving weight multiplication at each terminal are calculated as a vector, and as mentioned above, at the terminal m, the m-th signal in the vector results in a desired signal while signals other than that are non-desired signals. Accordingly, each terminal, unless grasping what number its desired signal is positioned in the calculated signal vector, is not able to demodulate a signal correctly, which poses a problem.

In view of such circumstances, the present invention is to provide a base station apparatus in which in a case where signals received at a plurality of receiving antennas included in each terminal are subjected to MMSE combining, each terminal is able to grasp a position of a desired signal in a signal vector obtained after combining, a terminal apparatus and a wireless communication system using them.

Means to Solve the Problems

The present invention provides a base station apparatus provided with a plurality of transmitting antennas which performs spatial multiplexing to signals addressed to a plurality of terminal apparatuses having a plurality of receiving antennas for performing communication, characterized in that, a base station receiving unit that receives channel state information between the transmitting antennas and each of the terminal apparatuses from each of the terminal apparatuses, a transmit weight calculation unit that calculates a transmit weight for performing spatial multiplexing transmission to the terminal apparatuses based on the received channel state information, a transmit weight multiplication unit that multiplies an information signal addressed to each of the terminal apparatuses to be performed spatial multiplexing for transmission by the transmit weight, and a base station transmitting unit that transmits a plurality of information signals subjected to spatial multiplexing by multiplying by the transmit weight and demodulation specification information to specify an information signal that needs to be demodulated by each of the terminal apparatuses from among the plurality of information signals subjected to spatial multiplexing.

Further, the base station apparatus of the present invention is characterized in that the demodulation specification information is dedicated information included in the control signals notified to each of the terminal apparatuses for enabling to discriminate which signal is an information signal that needs to be demodulated by each of the terminal apparatuses.

Furthermore, the demodulation specification information and other information included in the control signal may be commonly used, or the demodulation specification information and a signal for channel estimation multiplied by the transmit weight may be commonly used.

Further, the present invention provides a terminal apparatus provided with a plurality of receiving antennas which communicates with a base station apparatus which includes a plurality of transmitting antennas and performs spatial multiplexing to signals addressed to a plurality of terminal apparatuses, characterized in that, a terminal receiving unit that receives information signals addressed to each of the terminal apparatuses which are performed spatial multiplexing for transmission by the base station and demodulation specification information to specify the information signal that needs to be demodulated by each of the terminal apparatuses, a combining unit that combines the information signals received by the plurality of receiving antennas, and a demodulation unit that detects a desired information signal addressed to the apparatus from among the combined information signals using the demodulation specification information and demodulates the desired information signal.

Further, the terminal apparatus of the present invention is characterized in that the combining unit combines the received information signals by multiplying the received information signals by a receiving weight which minimizes a mean square error between the received information signals and the desired information signal transmitted from the base station.

Further, the present invention is a wireless communication system characterized by including: the base station apparatus and the terminal apparatus.

Advantages of the Invention

Using the present invention, when signals received by a plurality of receiving antennas included in each terminal are subjected to MMSE combining in a system for transmitting with spatial multiplexing transmitting signals addressed to a plurality of terminals simultaneously, it becomes possible for each terminal to grasp a position of a desired signal in a signal vector obtained after combining, thus allowing each terminal to demodulate a desired signal addressed to the terminal.

MODE FOR CARRYING OUT THE INVENTION

Description will hereinafter be given for embodiments of the present invention with reference to attached drawings.

First Embodiment

Figure 1:
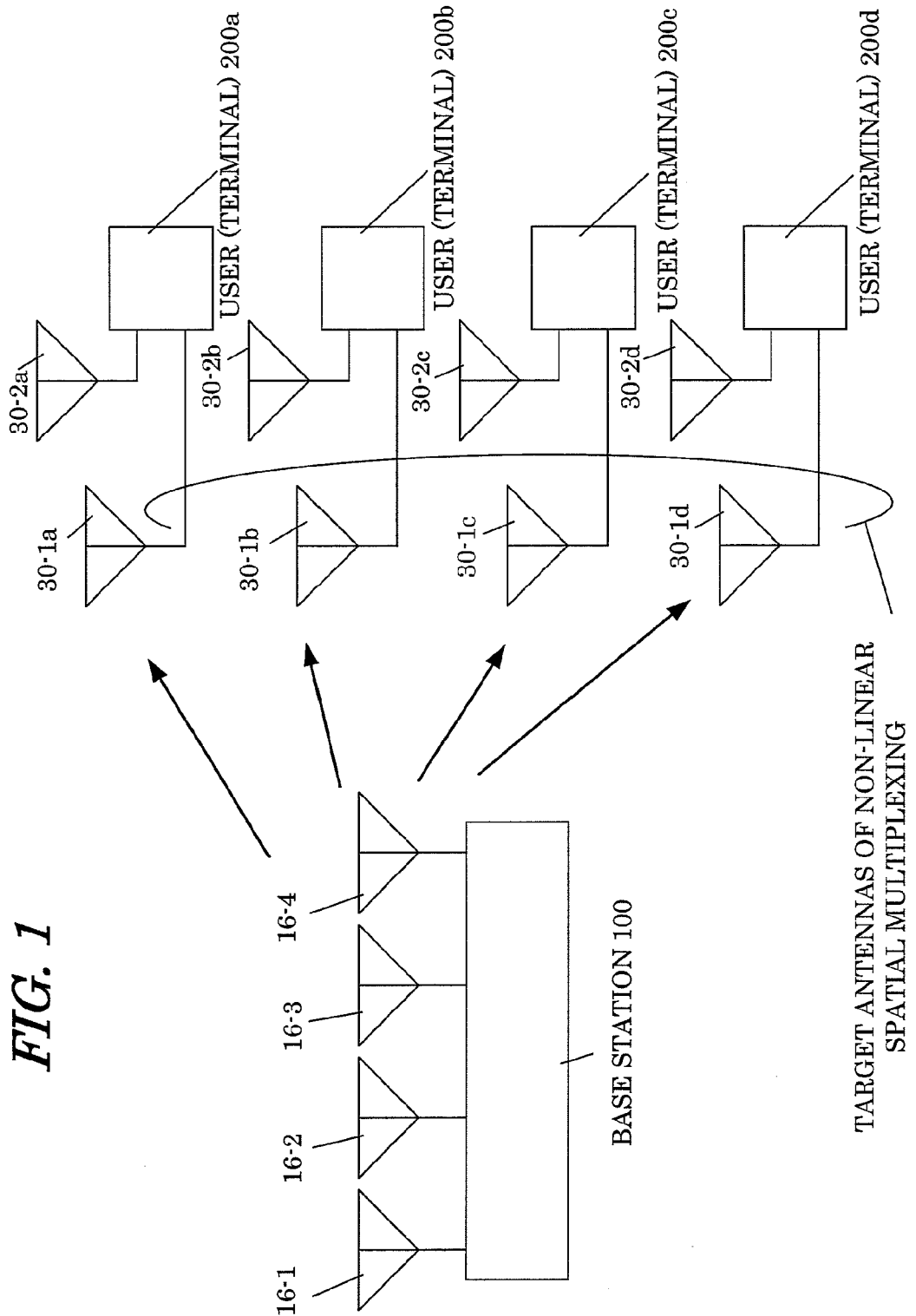
FIG. 1 is a diagram showing an MU-MIMO wireless communication system in a first embodiment.

First, an example of an MU-MIMO system to which the present embodiment is directed is shown in FIG. 1. As shown in FIG. 1, in the MU-MIMO system to which the present embodiment is directed, a base station 100 having a plurality of transmitting antennas performs spatial multiplexing to different signals addressed to terminals 200a, 200b, 200c and 200d having a plurality of receiving antennas to be transmitted with a same resource. Note that, the transmitting processing is performed in such a way that the total number of receiving antennas to be subjected to spatial multiplexing of all the terminals 200a to 200d are larger than the number of transmitting antennas included in the base station 100, and in the base station 100, any of the plurality of receiving antennas included in each of the terminals 200a to 200d are to be subjected to spatial multiplexing so that multi-user interference to signals received by those target antennas is suppressed. Note that, the number of terminals in FIG. 1 is four, however not limited thereto.

In the example shown in FIG. 1, each of the antennas to be subjected to spatial multiplexing has a numeral 30-1 added thereto, and antennas which are not to be subjected to spatial multiplexing have numerals 30-2 added thereto. In this FIG. 1, a configuration is provided in which the base station 100 includes four transmitting antennas 16-1 to 16-4 and each terminal 200a, b, c or d has two receiving antennas 30-1 and 30-2, so that one stream (signal sequence) is transmitted from the base station 100 to each terminal, however, not limited thereto, and for example, a terminal may have three or more receiving antennas, and in such a case, it may be configured that two or more streams are transmitted to a terminal. However, it is assumed that the number of streams transmitted to each terminal is less than the number of receiving antennas included in each terminal, and a plurality of streams transmitted to a terminal are separated from each other to be received at the terminal. Further, the number of transmitting antennas included in the base station is not limited to four, as long as a plurality of transmitting antennas is included. Moreover, depending on a system, all of a plurality of antennas included in the base station is not necessarily used for transmission all the time, and some of transmitting antennas are selected in the base station to be used, while signals are not transmitted from unselected transmitting antennas, in some cases. In such cases, the present invention is directed to a circumstance where the total number of receiving antennas of all terminals which are to be subjected to spatial multiplexing exceeds the number of transmitting antennas used for transmission in the base station (the number of selected transmitting antennas).

Figure 2:
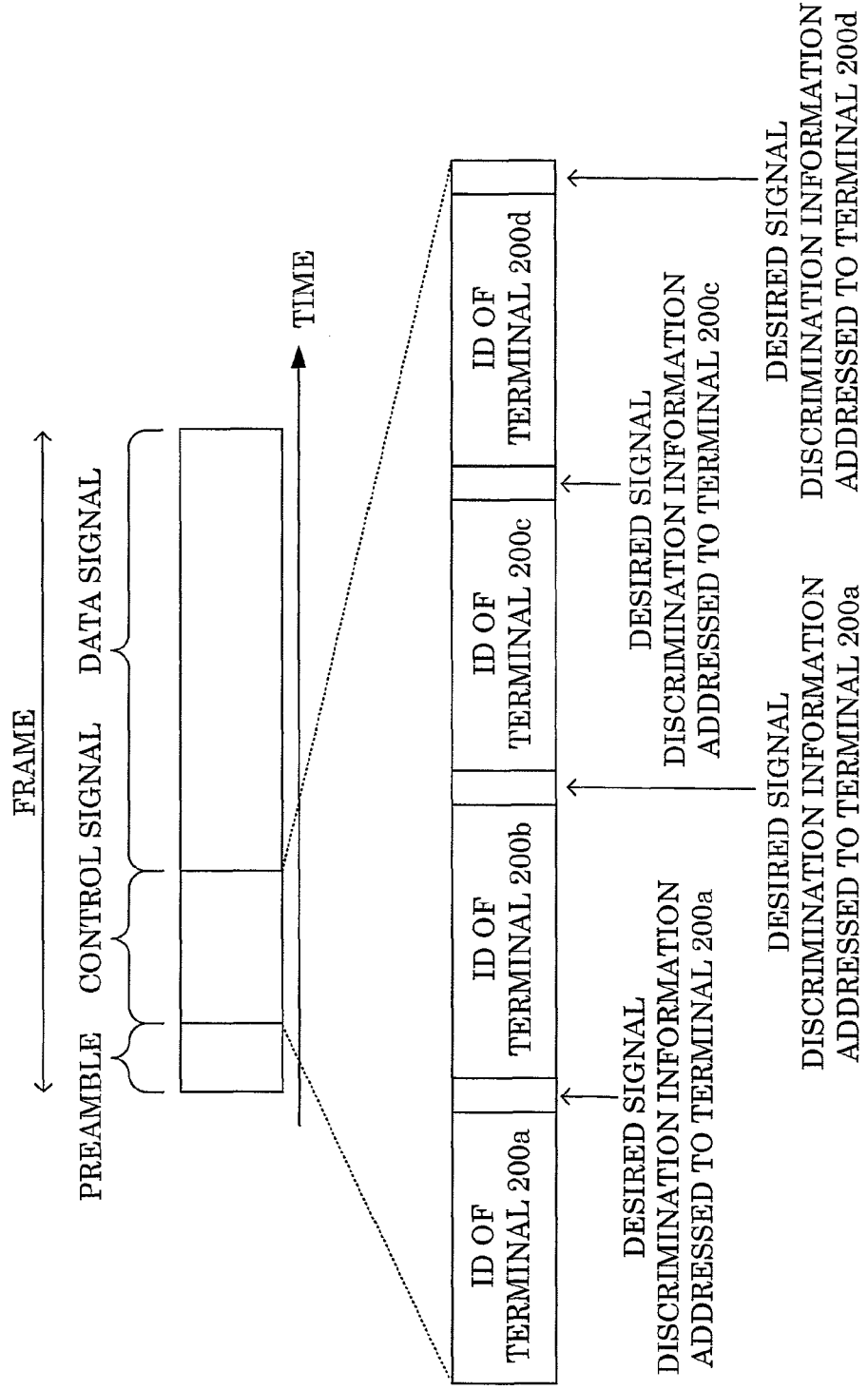
FIG. 2 is a diagram showing a frame format in the first embodiment.

In the first embodiment according to the present invention which is directed to such the MU-MIMO system, shown is a method for explicitly notifying each terminal of a position of a desired signal to be demodulated thereby from a base station. First, a frame format in the case of using a notification method of a position of a desired signal in the present embodiment is shown in FIG. 2. Note that, the present embodiment is directed to a wireless LAN system such as IEEE802.11, and the frame format shown in FIG. 2 is a simplified frame in the wireless LAN system. In the wireless LAN system, a base station is sometimes referred to as an access point, and in a system where among a plurality of terminals, one terminal manages and relays communication of other terminals, the terminal responsible for management may function as a base station or an access point.

As shown in FIG. 2, a frame in the present embodiment is comprised of a preamble, a control signal and a data signal subjected to spatial multiplexing. Note that, here, it is assumed that the preamble and the control signal are not subjected to spatial multiplexing. The preamble among these signals constituting the frame is a known signal between transmitting and receiving apparatuses that is used for detecting a synchronous timing or channel estimation, and sometimes referred to as a pilot signal or a reference signal. Further, the control signal is a signal showing a terminal ID or the like serving as an address of a following data signal, and each terminal first demodulates the control signal and based on a demodulation result, demodulates the data signal.

Here, demodulation based on a channel estimation result using the preamble is performed not only for the data signal but for the control signal, however, since an equivalent channel in view of spatial multiplexing processing at a base station side is different between the data signal subjected to spatial multiplexing and the control signal not subjected to spatial multiplexing, a preamble is prepared separately for each thereof to estimate a channel used for demodulation. Specifically, a preamble multiplied by a same transmit weight as that is multiplied by the data signal to be transmitted, and a preamble which is not subjected to such multiplication processing to be transmitted are prepared, so that the former is used as the preamble for data signal demodulation, and the latter is used as the preamble for control signal demodulation. Note that, it is assumed that the preamble used for demodulating a data signal is multiplied by the same transmit weight as that for the data signal to be transmitted, however, not subjected to spatial multiplexing at the time of transmitted from a plurality of antennas but orthogonalized in a time domain, a frequency domain and the like to be transmitted. Moreover, it may be configured so that orthogonalization is performed in a code domain using a spread code.

Each terminal calculates a channel estimation value for use in demodulation of a control signal and a data signal using such a preamble respectively, and first demodulates a control signal. As mentioned above, the control signal includes a terminal ID or the like serving as an address of a data signal, and each terminal demodulates, when a one's ID is included in the demodulated control signal, a following data signal, and when the one's ID is not included, performs processing to discard a subsequent signal.

In the wireless LAN system of IEEE802.11 or the like, a terminal ID serving as an address of a data signal is notified as a control signal in this manner, and each terminal determines, based on a demodulation result of the notified control signal, whether or not to demodulate a following signal, so that demodulation of a data signal even when the terminal is not included in an address is prevented from performing, thus making it possible to suppress power consumption or the like along with demodulation processing.

In the present embodiment, not only the information showing such a terminal ID, but also information showing which signal is the signal that needs to be demodulated by each terminal addressed from the data signal is notified to each terminal as a control signal. In the present embodiment, such information is referred to as desired signal discrimination information, and is assumed to be added immediately after each terminal ID as shown in FIG. 2. Here, though the desired signal discrimination information is provided, not limited thereto in embodiments described below. Accordingly, information to specify the information signal that needs to be demodulated by each terminal apparatus is termed as demodulation specification information. In the present embodiment, the demodulation specification information is the desired signal discrimination information.

In the present embodiment, for example, when an ID of the terminal 200a is inserted at a head of a control signal, desired signal discrimination information immediately thereafter is to show a position of a signal that needs to be demodulated by the terminal 200a, and subsequently, when an ID of the terminal 200b is inserted, desired signal discrimination information immediately thereafter is to show a position of a signal that needs to be demodulated by the terminal 200b. Here, assuming that the desired signal discrimination information in the case of a signal that needs to be demodulated being first in a signal vector is 00, the desired signal discrimination information in the case of being second is 01, the desired signal discrimination information in the case being third is 10, the desired signal discrimination information in the case being fourth is 11, the desired signal discrimination information in the case of performing spatial multiplexing to the four terminals 200a to 200d is assumed to be just 8 bits. In the case of including such desired signal discrimination information in a control signal, for example, when the desired signal discrimination information addressed to the terminal 200a is 10, the terminal 200a demodulates a third signal as a desired signal among signal vectors calculated by multiplying signals received by a plurality of antennas by a receiving weight. Similarly, when the desired signal discrimination information addressed to the terminal 200b is 00, the desired signal discrimination information addressed to the terminal 200c is 01, and the desired signal discrimination information addressed to the terminal 200d is 11, the terminal 200b, the terminal 200c and the terminal 200d are assumed to demodulate a first signal, a second signal, and a fourth signal respectively as a desired signal.

In this manner, along with a terminal ID, information showing a position of a signal that needs to be demodulated by a terminal shown by the ID is added as a control signal, and even when a desired signal and an undesired signal are included among signal vectors after receiving weight multiplication, each terminal is thereby capable of grasping appropriately a position of a desired signal so as to demodulate the desired signal.

Figure 3:
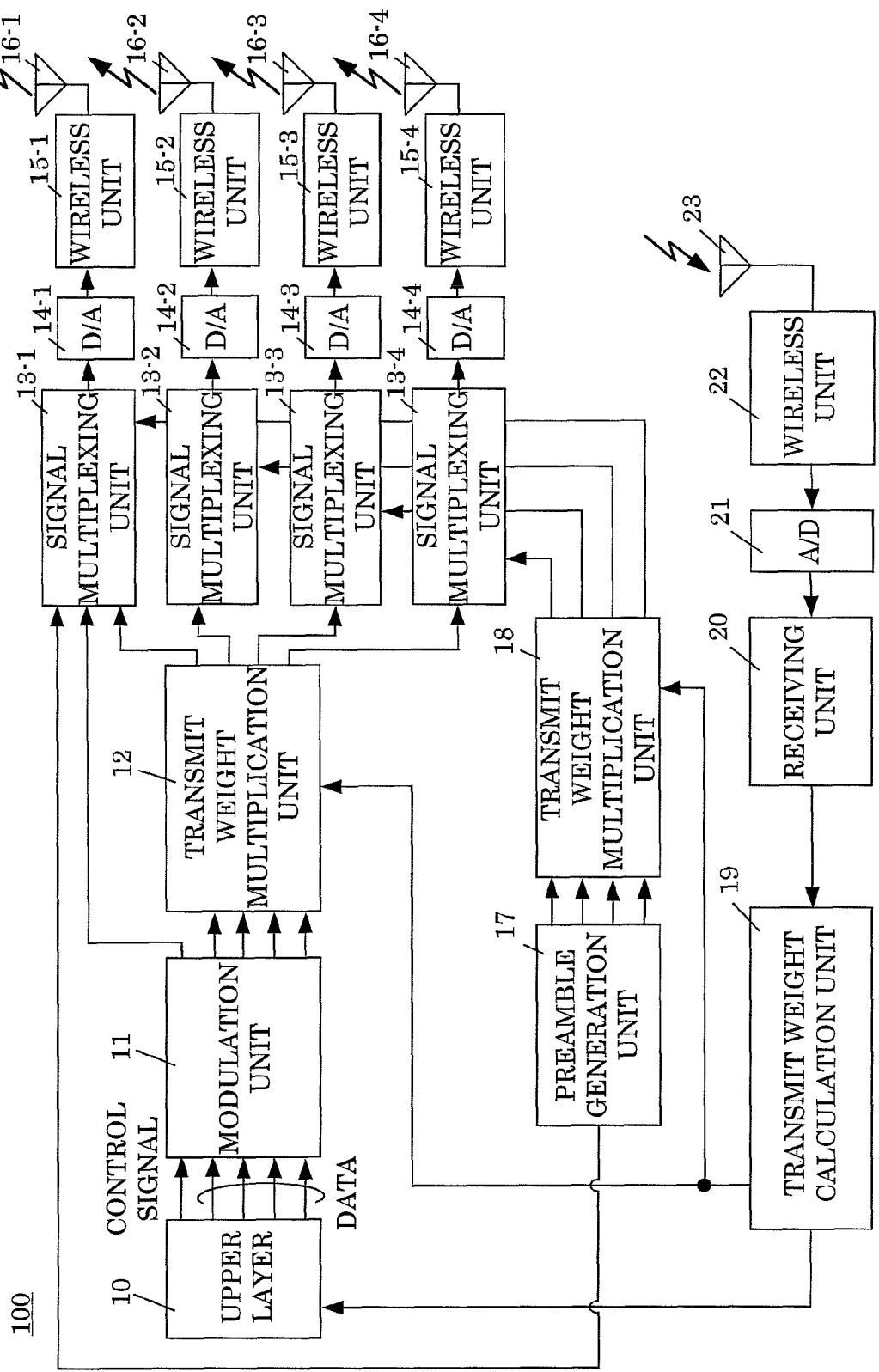
FIG. 3 is a block diagram showing a base station in the first embodiment.

Here, an apparatus configuration of the base station 100 in the present embodiment is shown in FIG. 3. Note that, the present embodiment is directed to a system for performing spatial multiplexing using a liner filter, and as shown in FIG. 3, the base station 100 is comprised of an upper layer 10, a modulation unit 11, transmit weight multiplication units 12 and 18, a signal multiplexing unit 13, a D/A unit 14, wireless units 15 and 22, a transmitting antenna unit 16, a preamble generation unit 17, a transmit weight calculation unit 19, a receiving unit 20, an A/D unit 21, and a receiving antenna unit 23.

In a case where MU-MIMO transmission using a linear filter is performed in the base station 100, first, channel state information (CSI) fed back from respective terminals 200a to 200d to be subjected to spatial multiplexing is received by the receiving antenna unit 23, and the received signal is converted into an A/D convertible frequency at the wireless unit 22, and after being converted into a digital signal from an analog signal at the A/D unit 21, and subsequently, demodulated or the like at the receiving unit 20 so that the fed back channel state information is obtained. Note that, the channel state information fed back from the respective terminals 200a to 200d refers to channels between transmitting antennas 16-1 to 16-4 of the base station 100 and antennas to be subjected to spatial multiplexing in the respective terminals 200a to 200d. Here, any transmitting method may be used for an uplink transmission method from the respective terminals 200a to 200d to the base station 100, and in FIG. 3, only one receiving antenna 23 is provided, however, it may be configured that a plurality of receiving antennas are provided so as to perform uplink MU-MIMO transmission.

The channel state information in the respective terminals 200a to 200d thus obtained is input to the transmit weight calculation unit 19 for calculation of a transmit weight which is necessary for MU-MIMO transmission. Specifically, first, a channel matrix H is generated from the channel state information in the respective terminals 200a to 200d, and a transmit weight $P_{MMSE}$ as follows is calculated by using the generated channel matrix H.

[Math 3]

$$P_{MMSE}=(H^H H+\xi I_{4\times 4})^{-1}H^H \qquad (3)$$

Wherein, $\xi$ is a mean noise power to signal power ratio, and $I_{k\times k}$ represents a unit matrix of k rows and k columns. The transmit weight calculated in this way is input to the transmit weight multiplication units 12 and 18, and information concerning arrangement of the channel state information of the respective terminals 200a to 200d at the time of generating the channel matrix H is input to the upper layer 10. The information is information showing that, at the time of generating channel matrix H using the channel state information fed back from the respective terminals 200a to 200d, the channel state information fed back from which terminal is arranged in which row in the matrix, and for example, in the case of $H=[H_{21}^T, H_{31}^T, H_{11}^T, H_{41}^T]^T$, information showing that the channel state information is arranged in the order of the terminals 200b, 200c, 200a, and 200d is supposed to be input to the upper layer 10.

In the upper layer 10, a terminal ID which is an address of a data signal, a control signal showing a position of a signal that needs to be demodulated by the terminal of the ID, and specific data addressed to each terminal are generated to be input to the modulation unit 11. Note that, a control signal is input to a topmost input line among five input lines input to the modulation unit 11 in FIG. 3, and in each of the remaining four input lines, data corresponding to the order of constituting the channel matrix notified from the transmit weight calculation unit 19 is input. That is, like the example described above, when the channel state information is arranged in the order of the terminals 200b, 200c, 200a, and 200d to constitute the channel matrix, data addressed to the terminals 200b, 200c, 200a, and 200d is input to the four input lines from the top in this order. Then, at the modulation unit 11, input digital data is modulated so that modulation signals such as QPSK and 16QAM are generated.

The signal modulated at the modulation unit 11 is input to the transmit weight multiplication unit 12 and the signal multiplexing unit 13. Here, input to the transmit weight multiplication unit 12 is a signal of modulated specific data addressed to each terminal which is subjected to spatial multiplexing to be transmitted, and input to the signal multiplexing unit 13 is a signal of a modulated control signal which is not subjected to spatial multiplexing and notified commonly to each terminal. In the transmit weight multiplication unit 12 to which the modulated data signal is input, a transmitting signal is multiplied by a transmit weight, and the result is input to the signal multiplexing unit 13. Note that, at the time, a signal that needs to be transmitted from an antenna **16-*i* is input to a signal multiplexing unit 13-*i***.

As mentioned above, in the present embodiment, for the preamble for channel estimation, two types thereof are provided to be used in channel estimation for a data signal and the channel estimation for a control signal, and the former is one in which a known system generated by the preamble generation unit 17 is multiplied by a same transmit weight as that is multiplied by the data signal at the transmit weight multiplication unit 18. Then, the preamble multiplied by the transmit weight is input to the signal multiplexing unit 13 from the transmit weight multiplication unit 18. Further, the latter is not to be multiplied by the transmit weight and is thereby directly input to the signal multiplexing unit 13 from the preamble generation unit 17.

At the signal multiplexing unit 13 in which these signals are input, the specific data signal addressed to each terminal, the control signal and the preamble are multiplexed so that the frame as shown in FIG. 2 is generated. Note that, the present embodiment is configured so that the control signal is transmitted only from the antenna 16-1, and a preamble used for demodulation thereof is similarly transmitted only from the antenna 16-1, and these are thereby multiplexed only at the signal multiplexing unit 13-1. The transmitting frame as shown in FIG. 2 generated at the signal multiplexing unit 13-1 in this manner is converted into an analog signal from a digital signal at the D/A unit 14, and after converted into a frequency which is transmittable by wireless at the wireless unit 15, transmitted from the transmitting antenna unit 16, respectively.

With such a configuration, along with an ID of a terminal showing an address of a data signal, information showing a position of a signal that needs to be demodulated by the terminal of the ID serves as a control signal, and the control signal and a data signal subjected to spatial multiplexing are transmitted, thereby, in the case of performing MMSE combining to signals received by a plurality of receiving antennas in each terminal, it becomes possible to notify of a position of a signal that needs to be demodulated by each terminal in a combined signal vector so that each terminal is able to demodulate a signal addressed to the terminal.

Figure 4:
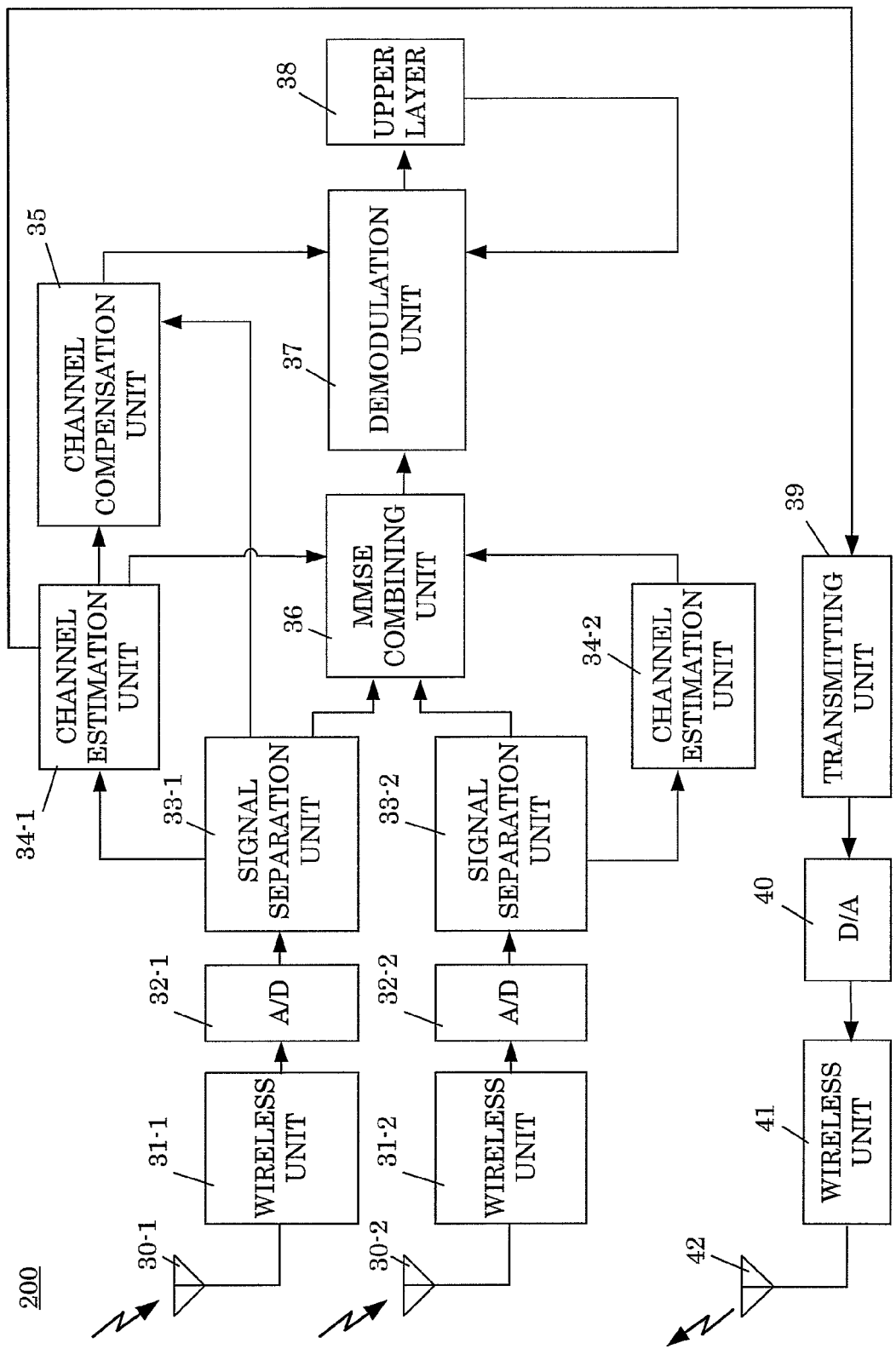
FIG. 4 is a block diagram showing a terminal in the first embodiment.

An apparatus configuration of each terminal which receives a signal processed in the base station as above is shown as follows. An apparatus configuration of a terminal 200 in the present embodiment is shown in FIG. 4. As shown in FIG. 4, the terminal 200 in the present embodiment is comprised of a receiving antenna unit 30, wireless units 31 and 41, an A/D unit 32, a signal separation unit 33, a channel estimation unit 34, a channel compensation unit 35, an MMSE combining unit 36, a demodulation unit 37, an upper layer 38, a transmitting unit 39, a D/A unit 40 and a transmitting antenna unit 42.

In the terminal 200, first, a signal transmitted from the base station 100 shown in FIG. 3 is received by the receiving antenna unit 30, and the received signal is converted into an A/D convertible frequency at the wireless units 31, and after converted into a digital signal from an analog signal at the A/D unit 32, the received signal is input to the signal separation unit 33. At the signal separation unit 33, a framed signal is separated as shown in FIG. 2. Specifically, the preamble, the control signal, the data signal are respectively separated to be input to the channel estimation unit 34, the channel compensation unit 35, and the MMSE combining unit 36. Note that, in the present embodiment, it is assumed that for a control signal which is not subjected to spatial multiplexing, only a signal received by the receiving antenna unit 30-1 is demodulated to be obtained, and at the signal separation unit 33-2, the preamble added for channel estimation of a control signal and the control signal are discarded.

Based on the preamble input from the signal separation unit 33, a channel is estimated at the channel estimation unit 34. Note that, at a channel estimation unit 34-1, channel estimation with both preambles for control signal demodulation and data signal demodulation is performed, and at a channel estimation unit 34-2, channel estimation with only the preamble for data signal demodulation is performed. At the time, the preamble for control signal demodulation is not multiplied by the transmit weight, so that a channel estimated by using the preamble is a channel between the transmitting antenna unit 16-1 of the base station and the receiving antenna unit 30-1 of each terminal, and this estimated result is input to the channel compensation unit 35. Furthermore, since the preamble for data signal demodulation is multiplied by a transmit weight, a channel estimated by a channel estimation unit **34-*n* in a terminal m is $H_{mn}P$, so that the estimated result is input to the MMSE combining unit 36**.

At the channel compensation unit 35, channel compensation of a control signal is performed, and the control signal subjected to channel compensation is input to the demodulation unit 37. Then, the control signal is demodulated at the demodulation unit 37 and the demodulated control signal is input to the upper layer 38 so that a terminal ID and the desired signal discrimination information notified from the base station 100 are obtained. At the upper layer 38, determination is made on whether or not a one's ID is included in a plurality of terminal IDs notified from the base station 100, and in the case where the one's ID is included, the desired signal discrimination information added immediately thereafter is notified to the demodulation unit 37. Whereas, in the case where the one's ID is not included in the control signal, demodulation processing of the data signal is stopped and an instruction is given to the demodulation unit 37 to discard all the received signals.

Such processing is performed to the control signal, and meanwhile, data signals received by two antennas respectively are combined at the MMSE combining unit 36. Specifically, the combining is performed by multiplying a received signal vector $y_m = [y_{m1}\ y_{m2}]^T$ received by two antennas of a terminal m by a receiving MMSE weight expressed by a next formula.

[Math 4]

$$W_m = (H_m P)^H \{H_m P (H_m P)^H + \xi I_{2 \times 2}\}^{-1} \qquad (4)$$

Wherein, $H_m = [H_{m1}{}^T\ H_{m2}{}^T]^T$.

Such signals multiplied by a receiving weight to be combined serve as a vector to be input to the demodulation unit 37. At the demodulation unit 37 in which the data signal vector is input, as described above, in the case where a one's ID is not included in the control signal, modulation processing is not performed and the input data signal vector is discarded. Additionally, in the case where a one's ID is included in the control signal, since the desired signal discrimination information showing a position of a desired signal of the terminal is input from the upper layer 38, and thereby, only a signal shown by the desired signal discrimination information among obtained signal vectors is extracted for performing modulation processing. Then, the modulated signal is output to the upper layer 38 so as to obtain a desired signal transmitted from the base station 100.

Further, in the terminal 200 in the present embodiment, there is a need to feed back the channel state information (CSI) to the base station 100, and this is performed in a manner such that information concerning a channel estimated by the channel estimation unit 34-1 is input to the transmitting unit 39, and transmitted toward the base station 100 from the transmitting antenna unit 42 via the D/A unit 40 and the wireless units 41. For this reason, in the present embodiment, an antenna to be subjected to spatial multiplexing at the base station 100 is the antenna 30-1 of each terminal so that spatial multiplexing to the antenna 30-2 is not performed. Further, in the present embodiment, it is assumed that measurement of CSI is performed by using preambles transmitted from respective antennas so as to be orthogonalized without transmit weight multiplication, and the measurement is performed in a frame with a different configuration from the frame shown in FIG. 2.

The configuration of the terminal as described above is provided so that signals received by two antennas of the antenna 30-1 which is a target of spatial multiplexing and the antenna 30-2 which is not the target are subjected to MMSE combining, and among the signal vectors after combining, a desired signal addressed to the terminal is able to be extracted to be demodulated. With such processing, compared to a case where a signal received by one antenna is demodulated, excellent receiving characteristics are able to be obtained.

Here, in the present embodiment, the control signal included in the frame shown in FIG. 2 is assumed to be not to be subjected to spatial multiplexing, however, differently from this, it may be configured so that the control signal is also multiplied by a transmit weight, and subjected to spatial multiplexing to be transmitted. In such a case, among a plurality of terminals, only a terminal which is subjected to spatial multiplexing is able to demodulate a control signal, however, for the terminal which is not able to demodulate a control signal, determination is made that a data signal addressed to the terminal is not included in the frame and the signal is discarded. On the other hand, the terminal which is able to demodulate a control signal to obtain a one's ID extracts, since a data signal addressed to the terminal is included in the frame, a signal addressed to the terminal from among data signals after receiving weight multiplication based on desired signal discrimination information modulated with the terminal ID and demodulates the desired signal. Such processing is performed and even when a control signal is transmitted after being subjected to spatial multiplexing, signals received by two antennas are subjected to MMSE combining so that from among the combined signal vectors, a desired signal addressed to the terminal is able to be extracted to be demodulated.

Further, the control signal in the present embodiment is configured so that immediately after each terminal ID, information showing a position of a desired signal that needs to be demodulated by a terminal having the ID is added and the terminal ID and the desired signal discrimination information are alternately arranged, however, not limited to this configuration as long as having a known format between a transmitter and a receiver. For example, it may be configured so that a plurality of terminal IDs are continuously arranged and thereafter, desired signal discrimination information is continuously arranged. Additionally, according to the number of terminals subjected to spatial multiplexing, an amount of signal which should be notified to each terminal as control information may vary, and in such a case, so as to realize highly efficient communication, the control signal shown in FIG. 2 may have a variable length. In the case of allowing the control signal to have a variable length, other control information to notify a terminal of a control signal length is required, so that each terminal obtains information showing the control information length to grasp a length of control information which adaptively changes and is able to extract a terminal ID or desired signal discrimination information from the frame appropriately. Information showing the control information length includes a symbol length of control information, the number of terminals subjected to spatial multiplexing and the like. Moreover, in a case where a signal is transmitted to only one terminal, that is, MU-MIMO transmission is not performed, since the desired signal discrimination information is not required, the desired signal discrimination information is eliminated and it is thereby possible to prevent degradation in transmission efficiency.

Furthermore, the present embodiment is directed to a wireless LAN system, and description has been given for a method for inserting information showing a position of a desired signal that needs to be demodulated by each terminal in a frame for explicitly notifying each terminal from a base station, however, the method is not limited to the wireless LAN system, and applicable to a cellular system or the like. In the cellular system, wireless resources divided by a time or a frequency are assigned to a number of terminals by a base station respectively so that the base station and respective terminals communicate with each other using the assigned resources, however, prior to data transmission/reception, first, the terminal needs to be notified of information of resource assignment from the base station. There may be cases where the resource assignment information is, as shown in FIG. 2, transmitted in the same frame as the data signal, transmitted with a different resource, as well as transmitted so as to be able to be demodulated by a plurality of terminals, or transmitted so as to be able to be demodulated by only a specific terminal to which a resource is assigned. Even in such various cases, along with information of ID or the like to specify a terminal to which a resource is assigned, the desired signal discrimination information as described above is notified to each terminal as control information, and each terminal is thereby able to extract a desired signal addressed to the terminal among signal vectors subjected to MMSE combining to be demodulated.

Additionally, in the present embodiment, a transmit weight for use in the base station is assumed to be calculated according to an MMSE criterion, however, not limited thereto and may be performed according to a ZF (Zero Forcing) criterion or the like, or may be configured to use a weight called code book determined in advance. Moreover, it is applicable to not only in MU-MIMO transmission using a linear transmission weight but also in MU-MIMO transmission using spatial multiplexing method including non-linear processing. Here, for the MU-MIMO transmission including non-linear processing, MU-MIMO transmission using THP (Tomlinson Harashima Precoding) is included. THP MU-MIMO transmission is configured so that a part of interference between terminals is cancelled with a linear transmit weight and the remaining interference is subtracted from a desired signal, so that interference generated due to transmitting signals addressed to a plurality of terminals with a same resource is cancelled, and increase of transmitting power due to subtraction of interference is suppressed with the THP, thereby allowing realization of spatial multiplexing excellent in power efficiency. For performing this THP MU-MIMO transmission, an interference subtraction function, a modulo arithmetic function for suppressing power, and the like are required to be added to the base station shown in FIG. 3, however, as with the linear MU-MIMO transmission described above, information showing a position of a signal that needs to be demodulated by each terminal is added to the control information so that it becomes possible to notify respective terminals of positions of desired signals respectively. Moreover, a terminal receiving a signal which is transmitted by the THP MU-MIMO transmission is able to be realized by only adding a modulo arithmetic function to the configuration shown in FIG. 4. Note that, a receiving MMSE weight for use in the MMSE combining unit 36 is expressed by a next formula.

[Math 5]

$$W_m = (I_{4\times 4} - F) R_v (H_m P)^H \{H_m P R_v (H_m P)^H + \xi I_{2\times 2}\}^{-1} \quad (5)$$

Herein, $R_v$ represents a covariance matrix of a transmitting signal vector, F represents a matrix showing a coefficient to be multiplied by interference subtracted on a base station side. The receiving weight expressed by the formula (5) is multiplied by received signals for combining the received signals, and based on the desired signal discrimination information notified from the base station, a desired signal is extracted from a signal vector after combining and the extracted signal is subjected to modulo arithmetic and thereafter modulated, thereby making it possible to obtain a desired signal which is specific to each terminal, respectively.

Further, the receiving weight expressed by the formulas (4) or (5) is a matrix, however, as has been described so far, the desired signal of each terminal in the present embodiment has only any component of a signal vector after receiving weight multiplication, and therefore, there is no need to multiply the receiving weight expressed by a matrix by received signals, and a desired signal may be obtained also by multiplying a vector of extracting only any row component in a matrix by received signals. At this time, determination on which row component is used to combine received signals may be made based on the desired signal discrimination information. For example, determination such as following may be made when a terminal receives desired signal discrimination information showing a position of a desired signal that needs to be demodulated by the terminal is first, received signals are combined using a first row in a matrix expressed by the formula (4) or formula (5), and when a terminal receives desired signal discrimination information showing a position of a desired signal that needs to be demodulated by the terminal is second, received signals are combined using a second row in a matrix expressed by the formula (4) or formula (5).

Further, in the present embodiment, an example which is directed to single carrier transmission is illustrated, however, the present invention is applicable also to a system performing multicarrier transmission. In the case of applying to the multicarrier transmission system, calculation or the like of a transmit weight may be performed for each subcarrier or in a unit into which subcarriers are grouped. Moreover, in the multicarrier transmission system, preambles may be arranged to different subcarriers and transmitted so as to be orthogonalized in a frequency domain. In such a multicarrier transmission system, an IFFT (Inverse Fast Fourier Transform) unit, an FFT unit, a GI (Guard Interval) insertion unit and the like are required to be provided to the base station and the terminal.

Moreover, in the present embodiment, a control signal and a preamble for channel estimation for use in modulation thereof are assumed to be transmitted only from one antenna, however, not limited thereto, and it may be configured that the control signal and the preamble for channel estimation are transmitted from a plurality of antennas included in the base station.

Further, in the present embodiment, a data signal to be transmitted is not subjected to error correction encoding, however, not limited thereto, and it may be configured to be subjected to error correction encoding in a base station so as to be decoded at a terminal.

Second Embodiment

In the first embodiment, the configuration of explicitly notifying each terminal of a position of a desired signal that needs to be demodulated thereby as desired signal discrimination information from a base station is illustrated, however, it may be configured the desired signal discrimination information is integrated with other control information without being notified explicitly, and in the present embodiment, an example of such demodulation specification information is illustrated.

Figure 5:
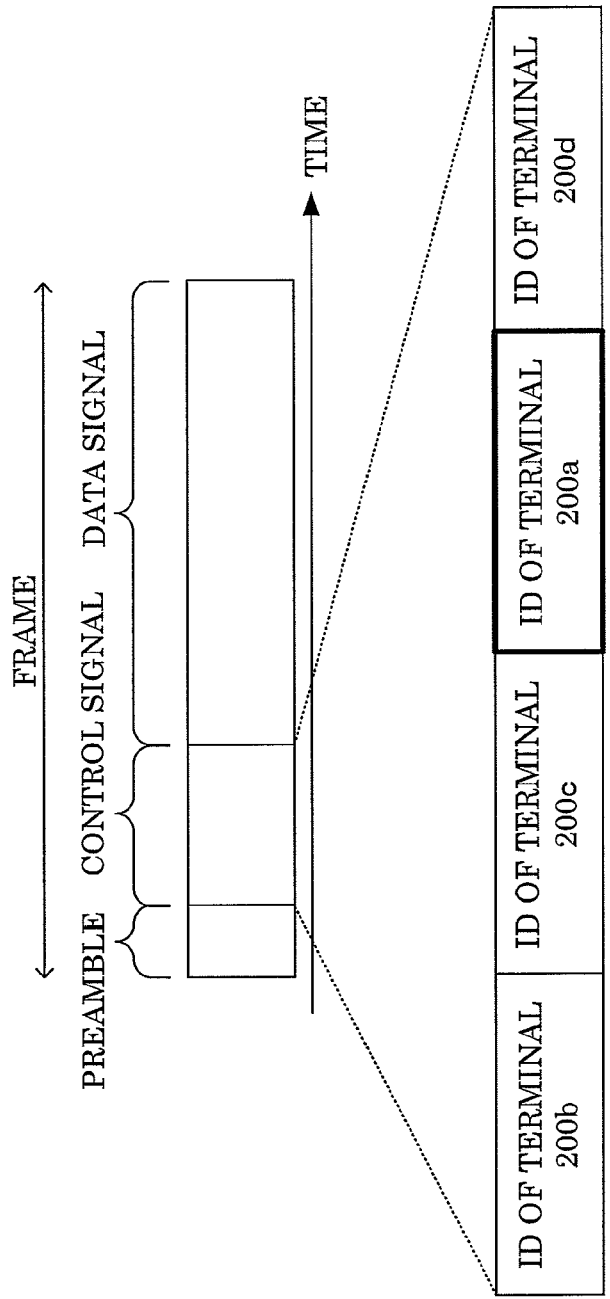
FIG. 5 is a diagram showing a frame format in a second embodiment.

A frame format in the present embodiment is shown in FIG. 5. Note that, the present embodiment is also, like the first embodiment, directed to a simplified frame in the wireless LAN system for description. As shown in FIG. 5, in the present embodiment, the control signal does not include the desired signal discrimination information and explicit notification of the desired signal discrimination information is not to be performed. However, since a position of a signal that needs to be demodulated by each terminal is required to be notified, it is configured that an order of terminal IDs included in a control signal is associated with the desired signal discrimination information so that each terminal grasps a description order of the terminal IDs to be thereby able to detect a position of a signal that needs to be demodulated by the terminal.

Specifically, for example, among calculated signal vectors in which signals received by a plurality of antennas are multiplied by a receiving weight, when the terminal 200a, the terminal 200b, the terminal 200c, and the terminal 200d should demodulate the third signal, the first signal, the second signal and the fourth signal respectively as a desired signal, as shown in FIG. 5, terminal IDs are included as a control signal in the order of the terminal 200b, the terminal 200c, the terminal 200a, and the terminal 200d. The base station 100 transmits such a control signal to notify each of the terminals 200a to 200d, and at each of the terminals 200a to 200d, it is thereby possible to grasp what number of a control signal a one's terminal ID is described, thereby making it possible to detect a position of a signal that needs to be demodulated by the terminal. For example, in the terminal 200a receiving a frame shown in FIG. 5, a control signal is demodulated so as to grasp the one's terminal ID is at the third in the control signal, it is thereby possible to grasp the third signal is a desired signal among signal vectors after MMSE combining, thus making it possible to demodulate a desired signal.

In this way, there is no need to explicitly notify each terminal of a position of a desired signal that needs to be demodulated thereby as desired signal discrimination information from a base station, and the desired signal discrimination information is able to be shown by devising a terminal ID or the like, placement of other control information, or an order or the like. The terminal position information is thereby able to be deleted so as to be able to prevent degradation in transmission efficiency due to increase of control information. The base station and the terminal in such a case are able to be realized by the configuration in FIG. 3, or FIG. 4, respectively.

In the present embodiment also, similarly to the first embodiment, the wireless LAN system is directed to be described, however, not only the wireless LAN system but also the a cellular system or the like may be directed. As mentioned above, in the cellular system, the resource assignment information of wireless resources divided by a time or a frequency needs to be notified to a terminal from a base station, and the placement or the order of the resource assignment information is changed corresponding to the desired signal discrimination information so as to allow to notify each terminal of the desired signal discrimination information without separately adding the desired signal discrimination information to the control signal. For example, in a case where the resource assignment information of one terminal is included in one symbol, like the terminal ID shown in FIG. 5, the order of the resource assignment information is brought to match that of the desired signal discrimination information, it becomes thereby possible to notify each terminal of the desired signal discrimination information. Further, in a case where the resource assignment information is divided into a plurality of frequency channels to be transmitted, a relation between a frequency channel and the desired signal discrimination information is determined in advance such that the terminal notified of the resource assignment information over a first frequency channel demodulates a first signal among signal vectors obtained after combining, and the terminal notified of the resource assignment information over a second frequency channel demodulates a second signal among signal vectors obtained after combining, it becomes thereby possible to notify each terminal of the desired signal discrimination information without explicit transmission of the desired signal discrimination information. Note that, the resource assignment information (desired signal discrimination information) needs not to be multiplexed with an information signal to be transmitted, and may be configured to be transmitted with other resource.

In the present embodiment also, like the first embodiment, the configuration may be made that a vector which is expressed in any one row in a matrix is used as a receiving weight, instead of the receiving weight expressed by the matrix shown by the formula (4) or formula (5), and in such a case, which row is used may be determined based on the desired signal discrimination information which is integrated with other control information.

Third Embodiment

In the above embodiments, the configuration is provided such that each terminal grasps a position of a desired signal that needs to be demodulated thereby based on the control information, however, may be provided such that the position of a desired signal is estimated based on a signal different from the control information, and in the present embodiment, an example of such demodulation specification information is illustrated.

Figure 6:
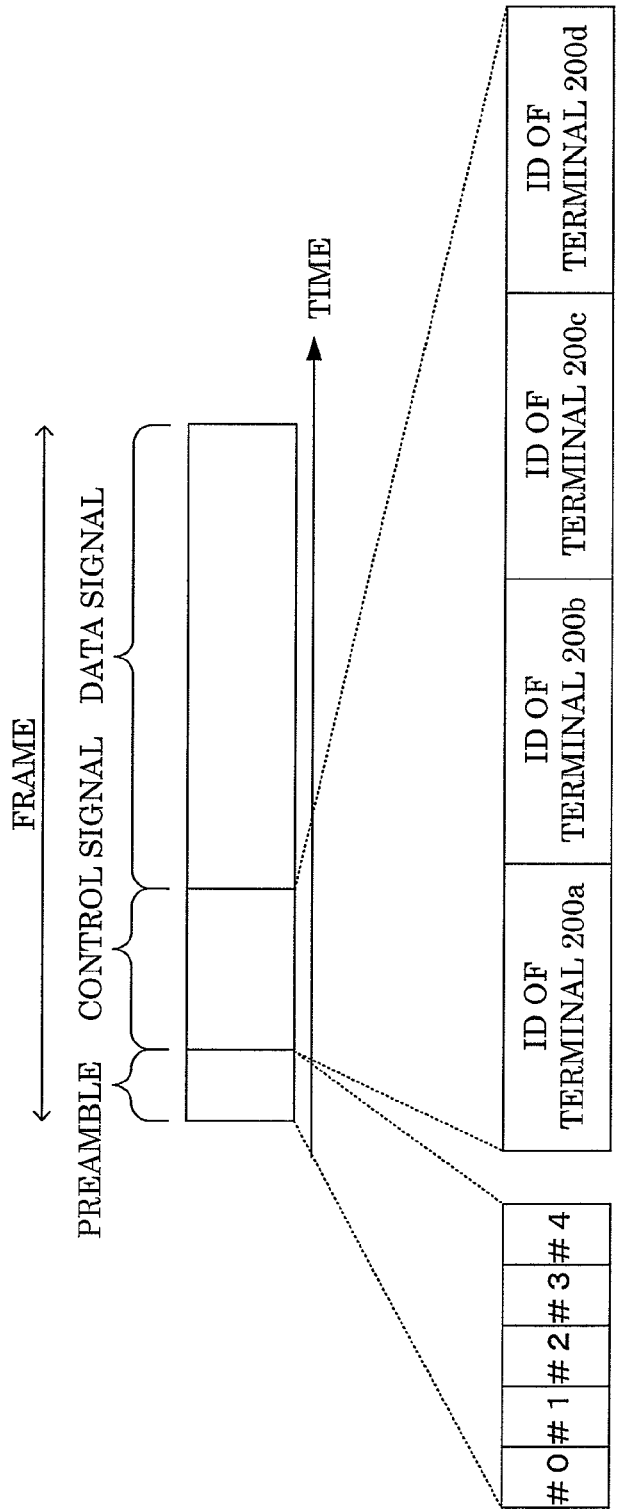
FIG. 6 is a diagram showing a frame format in a third embodiment.

A frame format in the present embodiment is shown in FIG. 6. Note that, though the terminal ID serving as an address of a data signal is included in the control signal in a frame shown in FIG. 6, the desired signal discrimination information showing a position of a signal that needs to be demodulated by each terminal is not included, and moreover, the description order of terminal IDs or the like is not assumed to show the desired signal discrimination information as in the second embodiment.

Further, it can be seen from FIG. 6 that five preambles (symbols) from #0 to #4 are included as preambles. As described in the first embodiment, this is because separate preambles are required for demodulating a control signal which is not multiplied by a transmit weight, and for demodulating a data signal which is multiplied by the transmit weight, and additionally, the preambles used for demodulating the data signal are not assumed to be subjected to spatial multiplexing and orthogonalized in a time domain, a frequency domain and the like to be transmitted. Here, an example in which those preambles are orthogonalized in a time domain is illustrated, and #0 shows a preamble for control signal demodulation, and #1 to #4 show preambles for data signal demodulation respectively. Note that, the preambles are such that #1 has $[1\ 0\ 0\ 0]^T$ which is input to the transmit weight multiplication unit 18, #2 has $[0\ 1\ 0\ 0]^T$ which is input to the transmit weight multiplication unit 18, #3 has $[0\ 0\ 1\ 0]^T$ which is input to the transmit weight multiplication unit 18, and #4 has $[0\ 0\ 0\ 1]^T$ which is input to the transmit weight multiplication unit 18, and at the transmit weight multiplication unit 18, these input preambles are multiplied by a same transmit weight as that is multiplied by a data signal, so that the preambles after transmit weight multiplication are supposed to be transmitted from all antennas. Such preambles are transmitted and it becomes thereby possible to prevent preambles from interfering with each other, so as to perform appropriate channel estimation.

Here, for example, each of receiving antennas to be subjected to spatial multiplexing in each terminal is assumed to be an antenna 1, and in the case of performing transmission using a transmit weight shown by the formula (3) as $H=[H_{21}{}^T, H_{31}{}^T, H_{11}{}^T, H_{41}{}^T]^T$ in the base station, an equivalent channel matrix $H_{eq}$ observed by the receiving antenna to be subjected to spatial multiplexing in each terminal is able to be expressed as follows.

[Math 6]

$$H_{eq} = \begin{pmatrix} a_{21} & \varepsilon_{22} & \varepsilon_{23} & \varepsilon_{24} \\ \varepsilon_{31} & a_{32} & \varepsilon_{33} & \varepsilon_{34} \\ \varepsilon_{11} & \varepsilon_{12} & a_{13} & \varepsilon_{14} \\ \varepsilon_{41} & \varepsilon_{42} & \varepsilon_{43} & a_{44} \end{pmatrix} \quad (6)$$

In the Formula (6), $a_{mk}$ and $\varepsilon_{mk}$, show equivalent channels when a signal transmitted from an antenna k in the base station are received by an antenna 1 in a terminal m. Wherein, $a_{mk}$ represents a channel through which a desired signal of the terminal m passes equivalently. Further, $\varepsilon_{mk}$ is a channel through which an interference signal passes equivalently, which is generated because the transmit weight shown by the formula (3) is obtained according to an MMSE criterion, and is normally a much smaller value compared to $a_{mk}$.

Through the equivalent channels shown by the formula (6), a data signal and preambles of #1 to #4 which are added for data signal demodulation go, and the preambles of #1 to #4 are received by each terminal as follows. First, at a terminal 1, the preamble to be received is $[\xi_{11}\ \varepsilon_{12}\ a_{13}\ \varepsilon_{14}]$ and at a terminal 2, the preamble to be received is $[a_{21}\ \varepsilon_{22}\ \varepsilon_{23}\ \varepsilon_{24}]$. Similarly, at a terminal 3, the preamble to be received is $[\varepsilon_{31}\ a_{32}\ \varepsilon_{33}\ \varepsilon_{34}]$, and at a terminal 4, the preamble to be received is $[\varepsilon_{41}\ \varepsilon_{42}\ \varepsilon_{43}\ a_{44}]$. This shows that a symbol of a received preamble having high power differs for each terminal such that the preamble having high power by #3 is received at the terminal 1, and the preamble having high power by #1 is received at the terminal 2.

A position of the received preamble having high power depends on the arrangement of the row vector of the channel matrix H configured in the base station, and then, how to configure the channel matrix H corresponds also to a position of a signal that needs to be demodulated by each terminal. Therefore, each terminal is able to grasp a position of a signal that needs to be demodulated thereby by detecting a position of a received preamble having high power. Each terminal is supposed to perform processing such that, for example, in the case of receiving the preamble #1 having high power, a first signal of a data signal vector obtained by being subjected to MMSE combining is modulated, and in the case of receiving the preamble #2 having high power, a second signal of the data signal vector obtained by being subjected to MMSE combining is modulated.

With such processing, even when notification of a position of a signal that needs to be demodulated by each terminal is not given thereto with the control information, the terminal is able to estimate a position of a signal that needs to be demodulated thereby, which can be said that the preamble which is multiplied by the same transmit weight as that of the data signal is substitutable for the desired signal discrimination information.

Figure 7:
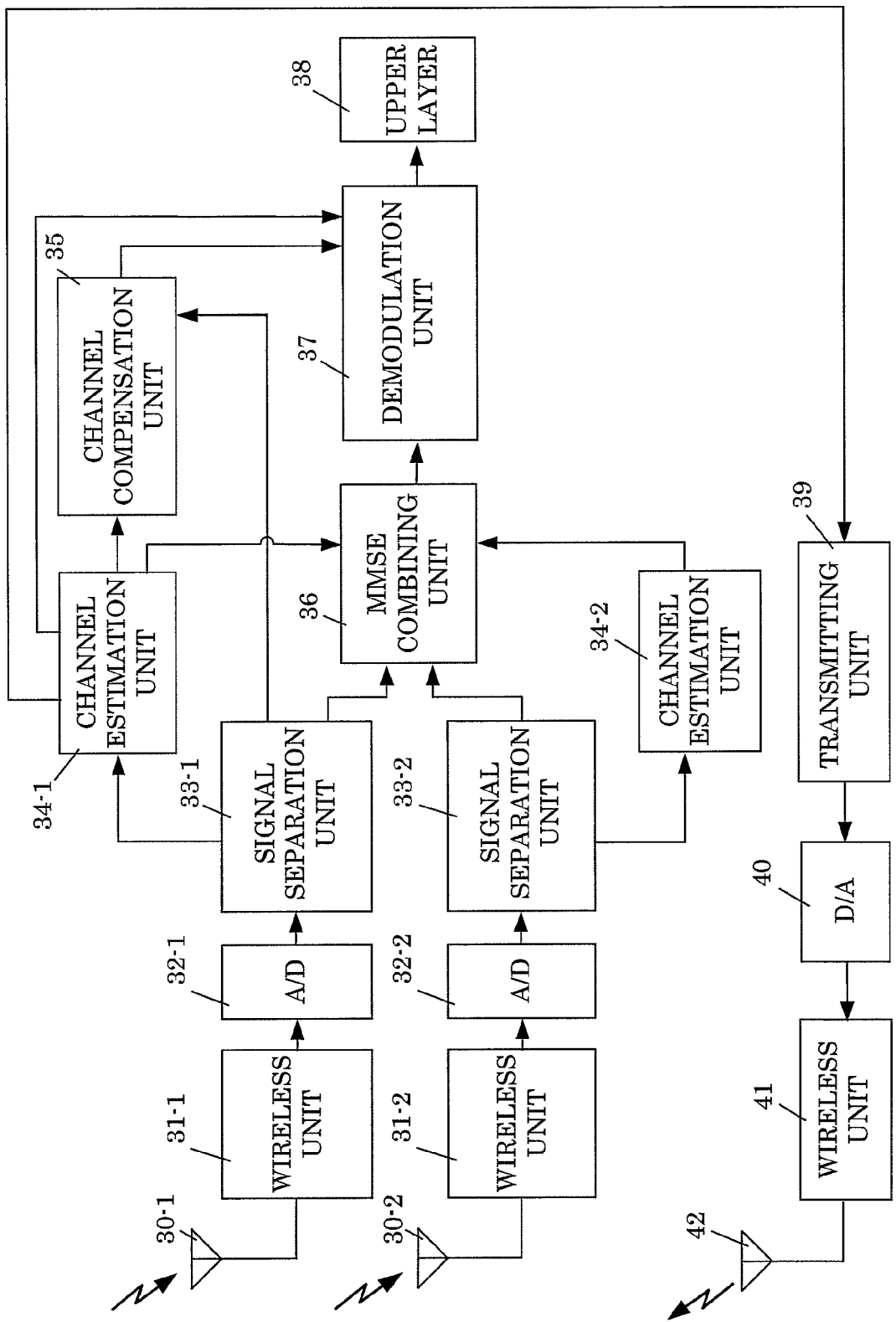
FIG. 7 is a block diagram showing a terminal in the third embodiment.
Figure 8:
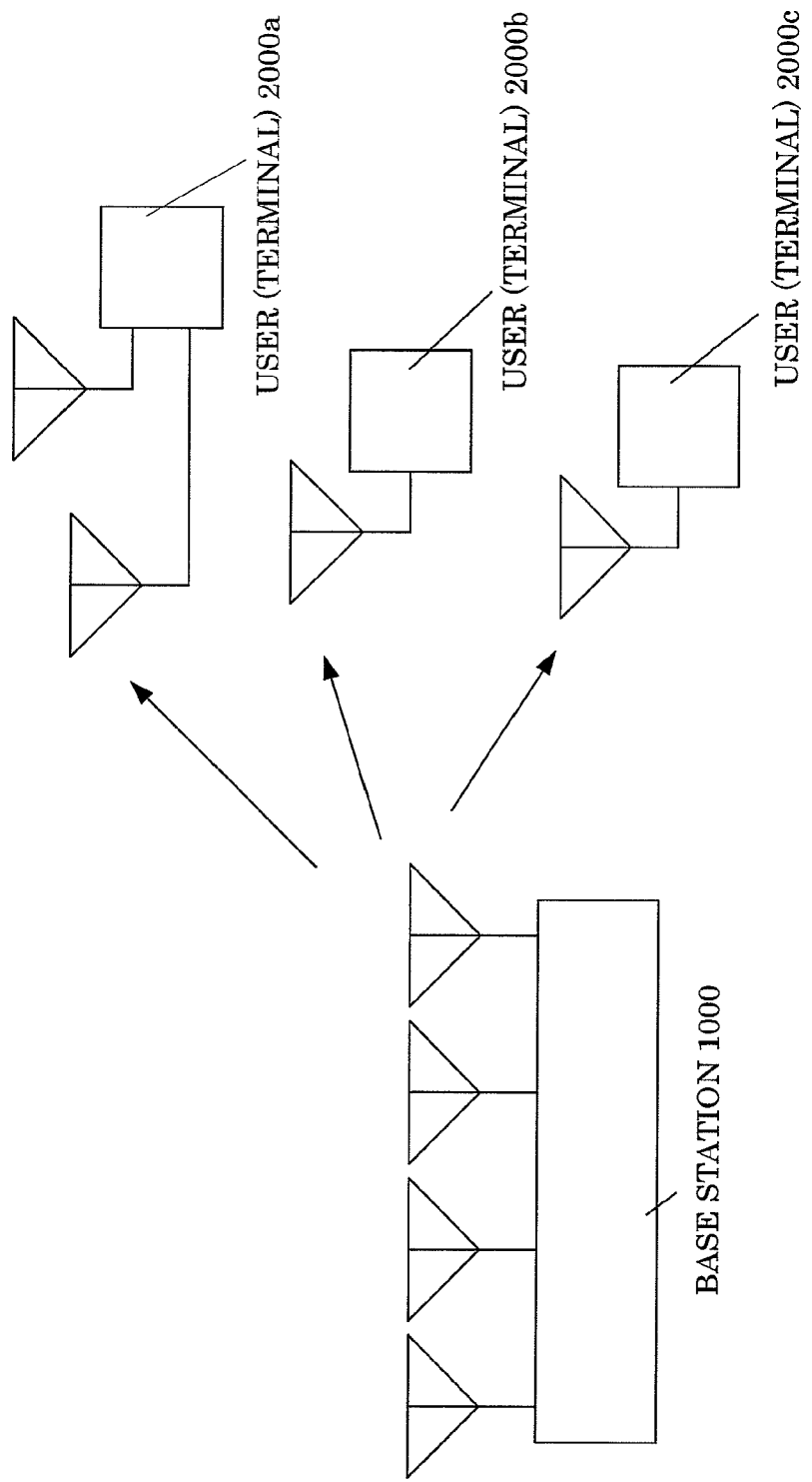
FIG. 8 is a diagram showing a conventional MU-MIMO wireless communication system.

An apparatus configuration of a terminal for performing such processing is shown in FIG. 7. A terminal apparatus shown in FIG. 7 is almost the same as the terminal apparatus shown in FIG. 4, and configured so that information concerning receiving power of the preambles #1 to #4 is input to the demodulation unit 37 from the channel estimation unit 34-1. The demodulation unit 37 grasps a position of a signal that needs to be demodulated by the terminal based on the receiving power of the preambles #1 to #4 and extracts a desired signal from among signal vectors subjected to MMSE combining to be demodulated. With such a configuration, even when notification of a position of a signal that needs to be demodulated by each terminal is not given thereto with the control information, it becomes possible for the terminal to estimate a position of a signal that needs to be demodulated thereby.

Here, in the present embodiment, though the preambles for data signal demodulation are orthogonalized in a time domain, but not limited thereto, and in the case of application to a multicarrier transmission system or the like, may be configured to arrange the preambles #1 to #4 to different subcarriers.

In this manner, the method of estimating a position of a signal that needs to be demodulated by each terminal using a preamble for data signal demodulation is applicable also to THP MU-MIMO transmission referred to also in the first embodiment. Note that, when THP MU-MIMO transmission is performed, an equivalent channel matrix $H_{eq}$ observed by the receiving antenna which is to be subjected to spatial multiplexing in each terminal is able to be expressed as follows.

[Math 7]

$$H_{eq} = \begin{pmatrix} a_{21} & \varepsilon_{22} & \varepsilon_{23} & \varepsilon_{24} \\ b_{31} & a_{32} & \varepsilon_{33} & \varepsilon_{34} \\ b_{11} & b_{12} & a_{13} & \varepsilon_{14} \\ b_{41} & b_{42} & b_{43} & a_{44} \end{pmatrix} \quad (7)$$

As described above, the THP MU-MIMO transmission is configured such that a part of interference between terminals is cancelled with a linear transmit weight and the remaining interference is subtracted from a desired signal, so that signals addressed to a plurality of terminals are prevented from interfering with each other, and $b_{mk}$ of the formula (7) represents a channel through which interference subtracted in the base station passes. This $b_{mk}$ is a larger value compared to $\varepsilon_{mk}$, and is also the value close enough to $a_{mk}$ compared therewith, which thereby results in that a plurality of preambles having high power are received in some terminals, so that it is impossible to grasp a position of a signal that needs to be demodulated merely by detecting the position of the preamble having high power like the case of performing MU-MIMO transmission with a linear weight. However, the number of received preambles at high power differs for each terminal, and thus not only the position but also the number thereof is also took into account, thereby making it possible for the terminal to estimate a position of a signal that needs to be demodulated thereby.

Specifically, such processing is performed in which the preamble received at the terminal 1 is $[b_{11}\ b_{12}\ a_{13}\ \varepsilon_{14}]$ and having high power to be received by preambles #1 to #3, so that a third signal of a data signal vector obtained by being subjected to MMSE combining is demodulated, and the terminal 2 is provided with $[a_{21}\ \varepsilon_{22}\ \varepsilon_{23}\ \varepsilon_{24}]$ having high power to be received only by preamble #1, so that a first signal of a data signal vector obtained after being subjected to MMSE combining is modulated. With such processing, even when THP MU-MIMO transmission is performed, the terminal is able to estimate a position of a signal that needs to be demodulated thereby based on the preamble for data signal demodulation.

Further, in the case of performing THP MU-MIMO transmission, processing to adaptively replace the signal vector to be transmitted depending on a channel state at an antenna which is to be subjected to spatial multiplexing in each terminal may be performed in some cases. This means to decide the linear weight P, the coefficient matrix F multiplied by interference, and an order of the transmitting signal vectors and the like shown in the formula (5) so as to minimize an error between the transmitting signal vector and the received signal vector of combined received signals of all terminals with respect to the channel matrix H configured in the base station. When a transmitting signal addressed to a terminal m is assumed to be $s_m$, and such adaptive control is performed, even in the case where the channel matrix is configured in the base station as $H=[H_{21}{}^T, H_{31}{}^T, H_{11}{}^T, H_{41}{}^T]^T$, the order of the transmitting vector may be replaced adaptively such as $[s_1, s_4, s_2, s_3]^T$ or $[s_4, s_2, s_3, s_1]^T$.

When such control is performed, an equivalent channel matrix $H_{eq}$ observed by a receiving antenna to be subjected to spatial multiplexing in each terminal is able to be expressed as follows, for example.

[Math 8]

$$H_{eq} = \begin{pmatrix} b_{21} & b_{22} & a_{23} & \varepsilon_{24} \\ b_{31} & b_{32} & b_{33} & a_{34} \\ a_{11} & \varepsilon_{12} & \varepsilon_{13} & \varepsilon_{14} \\ b_{41} & a_{42} & \varepsilon_{43} & \varepsilon_{44} \end{pmatrix} \quad (8)$$

The transmitting signal vector at the time is $[s_1, s_4, s_2, s_3]^T$. In such a case, a preamble to be received at the terminal 2 is $[b_{21}, b_{22}, a_{23}, \varepsilon_{24}]^T$, so as to be received at high power by preambles #1 to #3. However, in the channel matrix H configured in the base station, the channel addressed to the terminal 2 is arranged in the first row, so that the first signal in the data signal vector obtained by being subjected to MMSE combining needs to be demodulated. For this reason, the number of preambles received at high power and a position of a signal that needs to be demodulated by the terminal do not necessarily match, to which the technique described above is not applicable.

Here, in the case of performing THP MU-MIMO transmission, multiplication of a receiving weight as shown in the formula (5) is required to be performed, and each terminal should thereby be notified of the matrix F from the base station. Note that, the matrix F is expressed by one in which components other than $b_{mk}$ of the matrix shown in the formula (8) are zero.

[Math 9]

$$F = \begin{pmatrix} b_{21} & b_{22} & 0 & 0 \\ b_{31} & b_{32} & b_{33} & 0 \\ 0 & 0 & 0 & 0 \\ b_{41} & 0 & 0 & 0 \end{pmatrix} \quad (9)$$

Thereby, the number of preambles received at high power is taken into account in conjunction with the notified matrix F, thereby making it possible for each terminal to grasp a position of a signal that needs to be demodulated thereby. Specifically, it is only necessary to detect in which row in the notified matrix F the row vector having a non-zero element of a number is in which 1 is subtracted from the number of preambles received at high power at each terminal. For example, at the terminal 2, three preambles are received at high power, and therefore, the row number of the matrix F is detected in which the number of the non-zero element is 2. Such is in the first row of the formula (9), and thereby, in the channel matrix H configured in the base station, it is possible to be estimated that the channel addressed to the terminal 2 is arranged in the first row. Accordingly, at the terminal 2, processing to demodulate the first signal in the data signal vector obtained by being subjected to MMSE combining is able to be performed. Similarly, at the terminal 1 receiving only the preamble #1 at high power, a row number of the matrix F in which the number of non-zero elements is 0 is detected. Such is a third row in the formula (9), and thereby, in the channel matrix H configured in the base station, it is estimated that the channel addressed to the terminal 1 is arranged in the third row. Accordingly, at the terminal 1, processing to demodulate the third signal in the data signal vector obtained by being subjected to MMSE combining is able to be performed. The processing as described above is performed so that even when processing to adaptively replace the signal vector to be transmitted is performed depending on a channel state at an antenna to be subjected to spatial multiplexing in each terminal, each terminal is able to grasp a position of a signal that needs to be demodulated thereby among data signal vectors after MMSE combining.

Additionally, in the present embodiment also, similarly to the first and second embodiments, it may be configured that not the receiving weight but a vector expressed in any one row in the matrix expressed by the matrix shown in the formula (4) or (5) is used as a receiving weight, and in such a case, determination may be made on which row is to be used based on the received preamble.

Note that, in the above-mentioned embodiments, as shown in FIG. 1, description has been given for the MU-MIMO system in which any of a plurality of receiving antennas included in each terminal are to be subjected to spatial multiplexing, and transmitting processing is performed in the base station so that multi-user interference to signals received by these target antennas is suppressed, however, the present invention is applicable to a case where a terminal performs receiving processing for performing MMSE combining to a signal received by a plurality of receiving antennas to obtain a desired signal without depending on the spatial multiplexing method at the base station.

Additionally, a program which operates in a mobile station apparatus and a base station apparatus related to the present invention is a program for controlling a CPU or the like (program which causes a computer to function) for realizing functions of the above described embodiments related to the present invention. Then, information treated in such apparatuses is temporarily stored in a RAM at the time of processing thereof, thereafter stored in various ROMs or HDDs, and read by the CPU as necessary for modification or writing. A recording medium to store the program may be any of a semiconductor medium (for example, such as a ROM and a non-volatile memory), an optical recording medium (for example, such as a DVD, an MO, an MD, a CD and a BD), a magnetic recording medium (for example, such as a magnetic tape and a flexible disk) and the like. Moreover, by executing a loaded program, not only that the functions of the above described embodiments are realized, but also that the functions of the present invention are realized by performing processing, based on an instruction of the program, in cooperation with an operating system or another application program and the like in some cases.

Further, in the case of distribution to the market, it is possible to store the program in a portable type recording medium so as to be distributed, or transfer to a server computer connected via a network such as Internet. In this case, a storage device of the server computer is also included in the present invention. Further, a part or all of the mobile station apparatus and the base station apparatus in the above described embodiments may be realized typically as an LSI which is an integrated circuit. Respective function blocks of the mobile station apparatus and the base station apparatus may be separately obtained as a processor or a part or all thereof may be integrated to be obtained as a processor. Further, a technique of obtaining an integrated circuit is not limited to an LSI and may be realized by a dedicated circuit, or a general purpose processor. Further, in the case of advent of a technology of obtaining an integrated circuit in replacement of an LSI with the advancement in the semiconductor technology, an integrated circuit according to the art may be used.

As described above, the embodiments of the present invention have been described in detail with reference to the drawings, but a specific configuration is not limited to the embodiments and design or the like not departing from the spirit of the invention is also included in the scope of claims.

DESCRIPTION OF REFERENCE NUMERALS

10 upper layer
11 modulation unit
12, 18 transmit weight multiplication unit
13 signal multiplexing unit
14 D/A unit
15 wireless unit
16 transmitting antenna unit
17 preamble generation unit
18 transmit weight multiplication unit
19 transmit weight calculation unit
20 receiving unit
21 A/D unit
22 wireless unit
23 receiving antenna unit
30 receiving antenna unit
31 wireless unit
32 A/D unit
33 signal separation unit
34 channel estimation unit 35 channel compensation unit
36 combining unit
37 demodulation unit
38 upper layer
39 transmitting unit
40 D/A unit
41 wireless unit
42 transmitting antenna unit
100 base station
200 terminal

The invention claimed is:

1. A base station apparatus provided with a plurality of transmitting antennas which performs spatial multiplexing to data signals addressed to a plurality of terminal apparatuses having a plurality of receiving antennas for performing communication, the base station apparatus comprising:
   a base station receiver configured to receive channel state information between the transmitting antennas and each of the terminal apparatuses from each of the terminal apparatuses, and demodulates so that the channel state information fed back from each of the terminal apparatuses is obtained;
   a transmit weight calculator configured to calculate a transmit weight for performing spatial multiplexing transmission to the terminal apparatuses based on the channel state information fed back from each of the terminal apparatuses;
   a modulator configured to modulate a control signal including a terminal ID which specify each of the terminal apparatuses and a data signal including an information signal addressed to each of the terminal apparatuses;
   a transmit weight multiplier configured to multiply the modulated data signal by the transmit weight, and multiplies a preamble including a signal for channel estimation addressed to each of the terminal apparatuses by the transmit weight;
   a signal multiplexer configured to perform spatial multiplexing to the multiplied data signal, and multiplexes the data signal subjected to spatial multiplexing, the multiplied preamble and the modulated control signal, as multiplexed signals; and
   a base station transmitter configured to transmit the multiplexed signals,
   wherein a position of the terminal ID or a position of the signal for channel estimation corresponds to a position of an information signal that needs to be demodulated by each of the terminal apparatuses, the terminal ID being included in the control signal and specifying each of the terminal apparatuses, and the signal for channel estimation being included in the preamble and being addressed to each of the terminal apparatuses.

2. A terminal apparatus provided with a plurality of receiving antennas which communicates with a base station apparatus which includes a plurality of transmitting antennas and performs spatial multiplexing to data signals addressed to a plurality of terminal apparatuses, the terminal apparatus, comprising:
   a terminal receiver configured to receive multiplexed signals from the base station apparatus, the multiplexed signals in which a data signal which is performed spatial multiplexing and a control signal being included, the data signal in which an information signal addressed to each of terminal apparatuses being included, the control signal in which a terminal ID which specify each of the terminal apparatuses being included, a position of the terminal ID corresponding to a position of an information signal that needs to be demodulated by each of the terminal apparatuses;
   a combiner configured to combine the information signal addressed to each of terminal apparatuses; and
   a demodulator configured to detect a desired information signal addressed to a one's terminal apparatus from among the combined information signals based on a position of a one's terminal ID, and demodulates the desired information signal.

* * * * *